United States Patent
Hodrus

(10) Patent No.: US 9,562,576 B2
(45) Date of Patent: Feb. 7, 2017

(54) METHOD FOR ASCERTAINING A BITING POINT OF A FRICTION CLUTCH DEVICE

(71) Applicant: Schaeffler Technologies GmbH & Co. KG, Herzogenaurach (DE)

(72) Inventor: Erhard Hodrus, Karlsruhe (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 75 days.

(21) Appl. No.: 14/419,410

(22) PCT Filed: Jul. 19, 2013

(86) PCT No.: PCT/DE2013/200067
§ 371 (c)(1),
(2) Date: Feb. 3, 2015

(87) PCT Pub. No.: WO2014/023304
PCT Pub. Date: Feb. 13, 2014

(65) Prior Publication Data
US 2015/0211588 A1  Jul. 30, 2015

(30) Foreign Application Priority Data

Aug. 6, 2012 (DE) .................. 10 2012 213 885
Nov. 7, 2012 (DE) .................. 10 2012 220 208
Nov. 19, 2012 (DE) .................. 10 2012 221 105

(51) Int. Cl.
F16D 48/06 (2006.01)

(52) U.S. Cl.
CPC ............. *F16D 48/066* (2013.01); *F16D 48/06* (2013.01); *F16D 2500/3024* (2013.01); *F16D 2500/3026* (2013.01); *F16D 2500/50275* (2013.01); *F16D 2500/70684* (2013.01)

(58) Field of Classification Search
CPC ................. F16D 2500/7061; F16D 2500/7082
See application file for complete search history.

(56) References Cited

U.S. PATENT DOCUMENTS 8,172,059 B2 *  5/2012  Reuschel .............. F16D 25/088
                                                    192/85.55
8,548,705 B2    10/2013 Eich et al.
2007/0199790 A1 *  8/2007  Whitmer ............... F16D 13/757
                                                    192/70.252

FOREIGN PATENT DOCUMENTS

DE  102011014572 A1  12/2011
DE  102011085039 A1  5/2012
DE  102012204940     10/2012

* cited by examiner

*Primary Examiner* — Ramya Burgess
*Assistant Examiner* — David Morris
(74) *Attorney, Agent, or Firm* — Simpson & Simpson, PLLC

(57) ABSTRACT

A method for ascertaining a biting point of a friction clutch device of a motor vehicle that is actuatable between a disengaged and an engaged position, the friction clutch device having a hydrostatic actuator device with at least one position sensor and at least one pressure force sensor, the friction clutch device being actuated in the disengagement and/or engagement direction, and data are obtained with the help of the at least one position sensor and the at least one pressure force sensor, while based on the obtained data a position force characteristic curve having a first section and a second section is obtained, the first section being approximated with the help of a linear equation and the second section being approximated with the help of a parabolic equation.

8 Claims, 4 Drawing Sheets

METHOD FOR ASCERTAINING A BITING POINT OF A FRICTION CLUTCH DEVICE

CROSS-REFERENCE TO RELATED APPLICATIONS

The present application is the United States national stage application pursuant to 35 U.S.C. §371 of International Application No. PCT/DE2013/200067, filed on Jul. 19, 2013, which application claims priority from German Patent Application No. DE 10 2012 213 885.4, filed on Aug. 6, 2012, German Patent Application No. DE 10 2012 220 208.0, filed on Nov. 7, 2012, and German Patent Application No. DE 10 2012 221 105.5, filed on Nov. 19, 2012, which applications are incorporated herein by reference in their entireties.

TECHNICAL FIELD

The invention relates generally to a method for ascertaining a biting point of a friction clutch device of a motor vehicle that is actuatable between a disengaged and an engaged position, the friction clutch device having a hydrostatic actuator device with at least one position sensor and at least one pressure force sensor, where the friction clutch device is actuated in the disengagement and/or engagement direction, and data are obtained with the help of the at least one position sensor and the at least one pressure force sensor.

BACKGROUND OF THE INVENTION

German Patent Application No. DE 10 2011 014 572 A1 (Eich et al.) describes a method for controlling an automated clutch, which comprises a hydraulic clutch actuating system with a hydrostatic actuator whose pressure is detected, where the pressure of the hydrostatic actuator is used to adapt the clutch characteristic curve, in order to improve the clutch characteristic curve adaptation for clutches, in particular, for directly operable dual clutches.

German Patent Application No. DE 10 2012 204 940 (Reibold et al.) describes a method for adapting parameters of a clutch of a dual-clutch transmission system which has a hydrostatic clutch actuator with a pressure sensor, in a motor vehicle, in which the following steps are carried out: engaging and/or disengaging the clutch, detecting a pressure pattern by means of the pressure sensor and the position of the clutch during engagement and/or disengagement of the clutch, adaptation of the parameters for the clutch from the pressure pattern and use of the adapted parameters in the subsequent operation of the clutch. A method for adapting clutch parameters of a dual-clutch transmission is thereby specified which is economical to use, and preferably gets by without a transmission test stand or roller test stand.

For more detailed information about the features of the present invention, we refer explicitly to German Patent Application No. DE 10 2011 014 572 A1 and German Patent Application No. 10 2012 204 940, which are incorporated herein by reference. The teachings of these references are to be regarded as a component of the present document. Features of these references are features of the present document.

BRIEF SUMMARY OF THE INVENTION

According to aspects illustrated herein, there is provided a method for ascertaining a biting point of a friction clutch device of a motor vehicle that is actuatable between a disengaged and an engaged position, the friction clutch device including a hydrostatic actuator device with at least one position sensor and at least one pressure force sensor, the method including the following steps: actuating the friction clutch device in a disengagement and/or engagement direction; ascertaining a pressure in a cylinder of the friction clutch device by means of the at least one pressure force sensor; ascertaining a travel distance covered by the actuator device by means of the at least one position sensor; and, obtaining a position-force characteristic curve having a first section and a second section, the first section being approximated with the help of a linear equation and the second section being approximated with the help of a parabolic equation.

According to aspects illustrated herein, there is provided a method for ascertaining a biting point of a friction clutch device of a motor vehicle that is actuatable between a disengaged and an engaged position, the friction clutch device having a hydrostatic actuator device with at least one position sensor and at least one pressure force sensor, where the friction clutch device is actuated in the disengagement and/or engagement direction, and data are obtained with the help of the at least one position sensor and the at least one pressure force sensor, wherein based on the obtained data a position force characteristic curve having a first section and a second section is obtained, the first section being approximated with the help of a linear equation and the second section being approximated with the help of a parabolic equation.

The object of the invention is to improve a method in ascertaining a biting point. In particular, precision is to be increased in ascertaining the biting point. In particular, precision is to be increased in ascertaining additional parameters, such as a prestressing force, a prestressing stiffness, a clamping force stiffness and/or form factors of a characteristic curve. In particular, comfort is to be increased in the operation of a motor vehicle. In particular, an improved method is to be provided for ascertaining a biting point for a dry clutch. In particular, a method for ascertaining a biting point having improved robustness is to be provided.

The object is fulfilled using a method for ascertaining a biting point of a friction clutch device of a motor vehicle that is actuatable between a disengaged and an engaged position, the friction clutch device having a hydrostatic actuator device with at least one position sensor and at least one pressure force sensor, the friction clutch device being actuated in the disengagement and/or engagement direction, and data are obtained with the help of the at least one position sensor and the at least one pressure force sensor, while based on the obtained data a position force characteristic curve having a first section and a second section is obtained, the first section being approximated with the help of a linear equation and the second section being approximated with the help of a parabolic equation.

The friction clutch device may have at least one friction clutch. The friction clutch device may have a single friction clutch. The friction clutch device may have a simple clutch. The friction clutch device may have two friction clutches. The friction clutch device may have a dual clutch.

The friction clutch device may serve for configuration in a drivetrain of the motor vehicle. The drivetrain may have an internal combustion engine. The drivetrain may have a transmission. The friction clutch may be positionable in the drivetrain between the internal combustion engine and the transmission. A torsional vibration damper may be positionable between the internal combustion engine and the friction clutch device. The friction clutch device may have an input part. The friction clutch device may have at least one output part. The friction clutch device may have a single output part. The friction clutch may have a first output part and a second output part. The input part of the friction clutch device may be drive-connectible to an output shaft of the internal combustion engine. The at least one output part of the friction clutch device may be drive-connectible to an input shaft of the transmission. The terms "input part" and "output part" are in reference to a power stream direction coming from the internal combustion engine.

A friction clutch, starting from a completely disengaged actuating position, in which there is essentially no transmission of power between the input part and an output part, may enable an increasing transmission of power, depending on actuation, all the way to a completely engaged actuating position, in which there is essentially complete transmission of power between the input part and an output part, where a transmission of power between the input part and the output part takes place non-positively, in particular by frictional engagement. Conversely, starting from a completely engaged actuating position, in which there is essentially complete transmission of power between the input part and an output part, a decrease in transmission of power may be enabled, depending on actuation, all the way to a completely disengaged actuating position, in which there is essentially no transmission of power between the input part and an output part. The friction clutch device may enable a transmission of power between the input part and the first output part or the second output part in a turnover exchange.

The friction clutch device may have a single plate clutch. The friction clutch device may have a multiple plate clutch. The friction clutch device may have a dry clutch. The friction clutch device may have a wet clutch. The friction clutch device may have a push clutch. The friction clutch device may have a pull clutch. The transmission device may be automatically operable.

For automated operation, the friction clutch device may have an actuator device. The actuator device may have at least one actuator. The actuator device may have a single actuator. The actuator device may have two actuators. An actuator device having a single actuator may serve to operate a single clutch. An actuator device having two actuators may serve to operate a dual clutch.

An actuator may serve for semi-hydraulic actuation of a friction clutch. An actuator may have a hydraulic link. An actuator may have a master cylinder. An actuator may have a slave cylinder. The slave cylinder may serve to act on a friction clutch. The hydraulic link may serve to transmit power between the master cylinder and the slave cylinder. An actuator may have at least one electromotive drive. The drive may serve to act on the master cylinder. An actuator may have a gear unit.

The at least one pressure force sensor may be a pressure sensor. The at least one pressure force sensor may serve to measure a pressure in a hydraulic link. The at least one pressure force sensor may be a force sensor. The at least one pressure force sensor may serve to measure a force on a friction clutch. The at least one position sensor may serve to measure a set position, in particular of an actuator. The at least one position sensor may enable detection of an angle of rotation. The at least one position sensor may be an angular sensor. The at least one position sensor may enable a displacement measurement. The at least one position sensor may be a distance sensor. The at least one position sensor may be an absolute distance sensor.

The biting point may describe a set position, in particular an actuator set position, at which a friction clutch begins to transmit a torque, when there is an actuation starting from a disengaged actuation position in the direction of an engaged actuation position. The biting point may describe a set position at which a friction clutch transmits a predetermined torque. The predetermined torque may be, for example, approximately 2-3 Nm.

The friction clutch device may have a controlling device. The controlling device may serve to control the friction clutch device. The controlling device may serve to control a friction clutch. The controlling device may serve to control the actuator device. The controlling device may serve to control an actuator. The controlling device may serve to carry out the method according to the invention. The controlling device may have an electric control unit. The controlling device may have a computing device. Data may be available to the computing device as an input variable. The computing device may issue output values that serve to control the friction clutch device or the actuator device. The controlling device may have a data storage device. The data storage device may have a non-volatile electronic memory, whose stored information can be deleted or overwritten electrically. The data storage device may have an EEPROM. A set position assigned to the biting point may be storable in the data storage device. In the present document, "biting point" may designate both the biting point as such and a set position assigned to the biting point. The biting point may be adaptable. The biting point may be a long-term biting point, which in operation is adapted only very slowly in selected situations.

With the help of the at least one position sensor and of the at least one pressure force sensor, a corresponding pressure force value may be detected in each case for a position value. A series of position-value pressure-force-value data may be detected. The detected values may be indexed. The detected values may represent data points. Position-value pressure-value data may first be detected, and afterward position-value force-value data may be ascertained from the position-value pressure-value data. Position-value force-value data may be obtained directly. The position-force characteristic curve may be obtained with the help of data points. The data points may be used to obtain an equation to describe the position-force characteristic curve.

The position-force characteristic curve may depict a force progression on a friction clutch as a function of a set position, in particular an actuator set position. The position-force characteristic curve may be depictable in a diagram in which a set position is plotted on an x axis and a force is plotted on a y axis. A data point of the position-force characteristic curve may include information about a set position value and a corresponding force value. The position-force characteristic curve may be formed with the help of mean values. The mean values may be formed on the basis of detected data. Data may be obtained in an actuation of a friction clutch in the disengagement direction. Data may be obtained in an actuation of a friction clutch in the engagement direction. The mean values may be obtained from the data detected in an actuation of a friction clutch in the disengagement direction and the data obtained in an actuation of a friction clutch in the engagement direction.

Starting from a predetermined set position value, the first section of the position-force characteristic curve may extend in the direction of smaller set position values. The first section of the position-force characteristic curve may be considered a prestressing force characteristic curve. The second section of the position-force characteristic curve may extend, starting from a predetermined set position value, in the direction of greater set position values. The second section of the position-force characteristic curve may be considered a clamping force characteristic curve. The predetermined set position value may be a set position value at which a total error characteristic curve has a minimum.

Using the method according to the invention, precision is increased in determining the biting point. Precision is increased in ascertaining additional parameters, such as a prestressing force, a prestressing stiffness, a clamping force stiffness and/or form factors of a characteristic curve. Comfort is increased in the operation of a motor vehicle. An improved method is provided for ascertaining a biting point for a dry clutch. A method for ascertaining a biting point having improved robustness is provided.

A total error characteristic curve can be ascertained for the ascertained position-force characteristic curve. The total error characteristic curve may be ascertained based on an error characteristic curve of the first section and an error characteristic curve of the second section. The total error characteristic curve may be standardized. To achieve the standardization, a sum of error absolute values of detected data points may be divided by a number of detected data points. That makes errors for different numbers of data points comparable with each other.

First, a last data point of the first section and a first data point of the second section may be obtained, then an absolute value of a difference between these data points may be determined, and after that the total error characteristic curve may be ascertained based on the absolute value of the difference. The last data point of the first section may be the nearest data point to the second section. The first data point of the second section may be the nearest data point to the first section.

For a specified biting point force, a biting point based on the total error characteristic curve may be obtained. The total error characteristic curve may have a minimum, and the minimum may be drawn upon to ascertain a biting point. The minimum may be a global minimum. For the ascertained position-force characteristic curve, an error characteristic curve may be obtained by subtracting a linear prestressing force characteristic curve from a system characteristic curve, and obtaining the biting point in the resulting clamping force characteristic curve for a specified biting point force. An overrun of a specified threshold value may be ascertained. The last data point of the error characteristic curve of the first section before overrunning the specified threshold value may be ascertained. This data point may be the basis for ascertaining the biting point.

The first section may have a lower position limiting value and an upper position limiting value, and the lower position limiting value and/or the upper position limiting value may be adjusted dynamically. A determination of the position-force characteristic curve may begin starting from a data point having an index at which a high precision may be expected, for example the data point having the index five. After that, the determination of the position-force characteristic curve may be continued using data points with decreasing indices. When an error for a data point lies above a predetermined threshold, the lower position limiting value can be set and consideration of data points having smaller indices may be omitted. The upper position limiting value can likewise be adjusted dynamically. In this way, outliers in marginal regions of the sections may be excluded from consideration, and the result improved.

The method may be carried out for a dry clutch and/or for a dual clutch. The method may be used for a clamping force curve that runs in a curve in the area of the biting point. The method may be carried out in an initial start-up of the friction clutch device.

In summary, and explained in other words, the invention thus yields, among other things, the determination of a biting point for a hydrostatically directly operated dry clutch at start-up. A straight line may be used in a left region and a parabola in a right region to approximate data. By shifting an index, an error curve may be obtained. In the error curve an index may be determined which has the smallest error. When calculating the error, the sum of the absolute values of the errors may be divided by the number of data points considered, and the error thus standardized. Data points left of a current index may be approximated using a straight line, and right of it using a parabola. A global minimum may be determined. The possibility also exists to determine the biting point only from an error of the straight line, i.e., to consider only the left part. If the standardized error rises above a firmly defined threshold here, then the last valid index may be determined as the index that defines the biting point region. A range for an estimate of the straight line may be shortened, in order to avoid considering outliers. A straight line estimation may be started, for example using the 5th point, which may still safely be assigned to the left straight line. The 4th point etc. may be added. In every step, the straight line and the error for the points may be determined. If the latter then unexpectedly increases greatly, for example, at the first point, then a range may be chosen dynamically by then leaving only the first point out of consideration. After the left margin has been reached, the cloud of points may then be extended toward the right.

"May" designates in particular optional features of the invention. Accordingly, in each case there is an exemplary embodiment of the invention that has the particular feature or particular features.

These and other objects, advantages and features of the present invention will be better appreciated by those having ordinary skill in the art in view of the following detailed description of the invention in view of the drawings.

BRIEF DESCRIPTION OF THE SEVERAL VIEWS OF THE DRAWINGS

An exemplary embodiment/exemplary embodiments of the invention will be described in greater detail below in reference to figures. This description will yield additional features and advantages. Concrete features of this exemplary embodiment/these exemplary embodiments may depict general features of the invention. Features of this exemplary embodiment/these exemplary embodiments combined with other features may also represent individual features of the invention.

The figures show the following, schematically and by way of example. The invention as well as the technical environment will now be described in greater detail by reference to the accompanying figures, in which the figures represent the following.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and, as such, may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
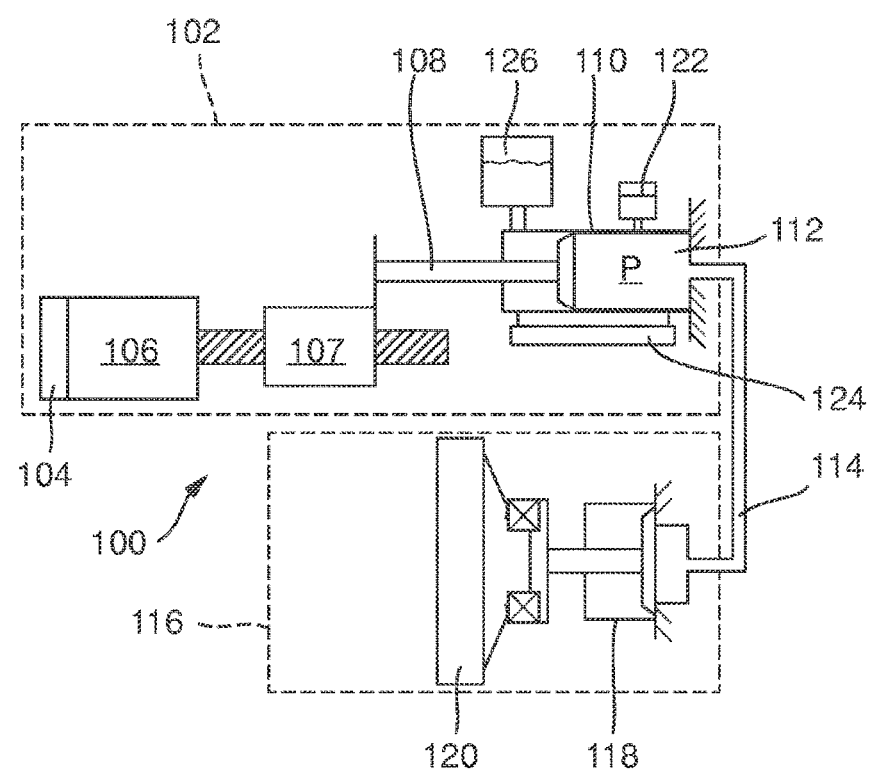
FIG. 1 is a configuration of a hydrostatic clutch system.

FIG. 1 shows a configuration of hydrostatic clutch system 100. This schematic depiction shows only the configuration for actuating one of two clutches of a dual-clutch transmission; the actuation of the other clutch is analogous. Hydraulic clutch system 100 includes on transmitting side 102 control device 104, which addresses actuator 106. Actuator 106 is kinematically connected through gear unit 107 to piston 108 of cylinder 110. With a change of position of actuator 106, and thus of piston 108 in cylinder 110 along the actuator path to the right, the volume of cylinder 110 is changed, whereby pressure P is built up in cylinder 110, which is transmitted via pressurizing agent 112 through hydraulic line 114 to receiving side 116 of hydraulic clutch system 100. Hydraulic line 114 is adapted with regard to its length and form to the construction space situation of the vehicle. On receiving side 116 pressure P of pressurizing agent 112 in cylinder 118 causes a change of distance, which is transmitted to clutch 120 in order to actuate the latter. Clutch 120 is a dry clutch. Pressure P in cylinder 110 on transmitting side 102 of hydraulic clutch system 100 can be ascertained by means of first sensor 122. First sensor 122 is preferably a pressure sensor. The travel distance covered by actuator 106 along the actuator path is ascertained by means of second sensor 124. In the one-time engagement/disengagement of clutch 120 measurement data are recorded in a suitable manner, on the basis of which adaptive parameters of hydrostatic clutch system 100 can be determined by suitable methods. This is explained below. Hydraulic line 114 is connectible to equalizing container 126, in order to enable a pressure and/or volume equalization.

Figure 2:
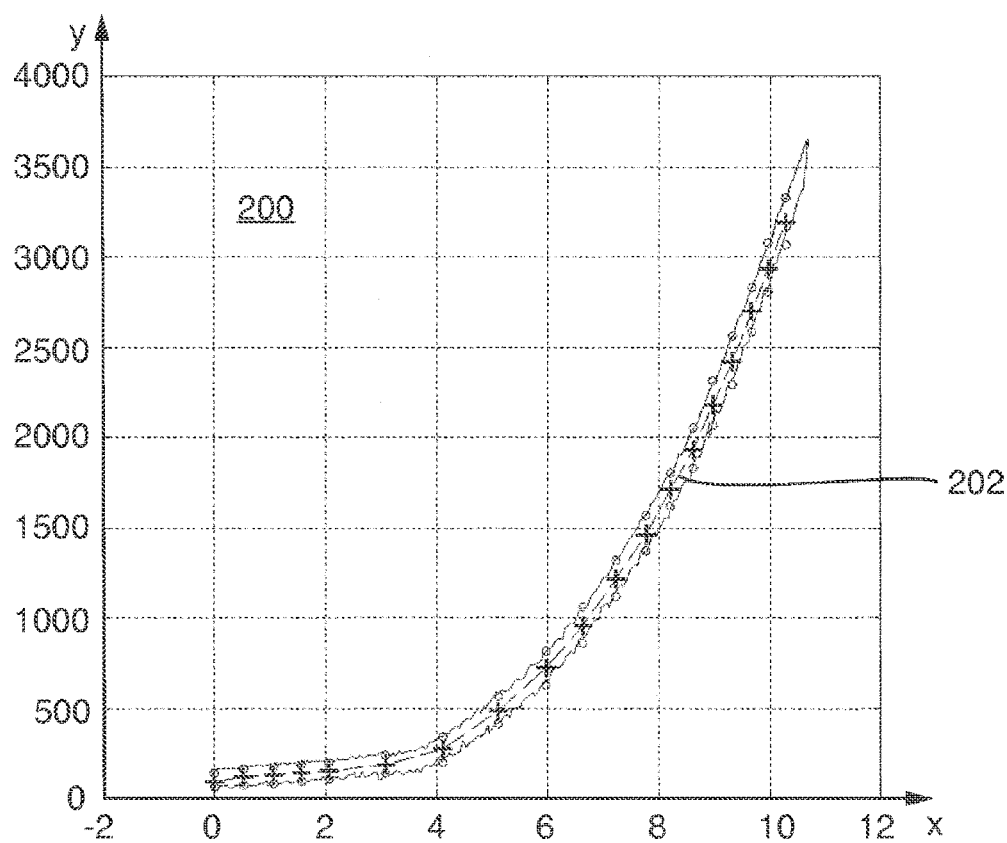
FIG. 2 is a diagram having a position-force characteristic curve of a dry clutch.

FIG. 2 shows diagram 200 with position-force characteristic curve 202 of a dry clutch, such as clutch 120 according to FIG. 1. In diagram 200, actuator set position values in mm are plotted on an x axis. The actuator set position values are detected with the help of a sensor, such as sensor 124 according to FIG. 1. In diagram 200, force values in N are plotted on a y axis. The force values are determined from pressure values, which are detected with the help of a sensor, such as sensor 122 according to FIG. 1. To determine position-force characteristic curve 202, the clutch is engaged in a ramp pattern by means of position specification to a maximum position or until a maximum pressure P is reached in the system; at the maximum the position is held briefly, and then disengaged again in a ramp pattern. The pressure signal is evaluated during the ramp the pressure. When predefined pressure or position thresholds are reached, data points are set during engagement and disengagement, each of which contains a position value and a force value. FIG. 2 shows the data points as circles. A mean value of the data points between the engaging and disengaging pressure branches is shown as a cross in FIG. 2. The characteristic curve formed with the mean values is designated as position-force characteristic curve 202.

Figure 3:
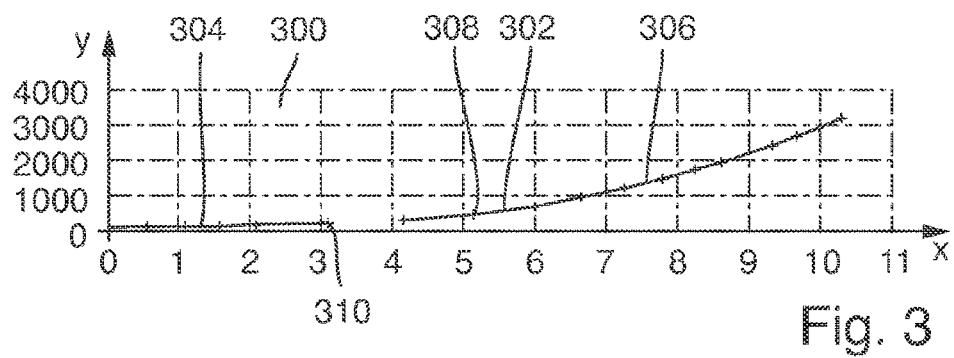
FIG. 3 is a diagram having a position-force characteristic curve with a first section and a second section.

FIG. 3 shows diagram 300 having position-force characteristic curve 302 with first section 304 and second section 306. In diagram 300, actuator set position values in mm are plotted on an x axis and force values in N on a y axis. Data points such as 308, of position-force characteristic curve 302, are identified with a cross. Data point 310 of position-force characteristic curve 302 is identified with a star. First section 304 of position-force characteristic curve 302 extends, starting from data point 310, to smaller actuator set position values. First section 304 of position-force characteristic curve 302 is approximated with the help of a linear equation, based on a registered position-force characteristic curve, such as position-force characteristic curve 202 according to FIG. 2. First section 304 of position-force characteristic curve 302 corresponds to a prestressing force characteristic curve. Second section 306 of position-force characteristic curve 302 is located at greater actuator position values, in reference to data point 310. Second section 306 of position-force characteristic curve 302 is approximated with the help of a parabolic equation, based on a registered position-force characteristic curve, such as position-force characteristic curve 202 according to FIG. 2. Second section 306 of position-force characteristic curve 302 corresponds to a clamping force characteristic curve.

Figure 4:
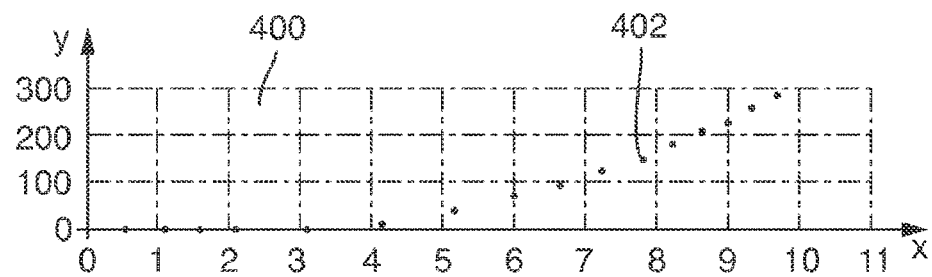
FIG. 4 is a diagram having an error characteristic curve of a first section of a position-force characteristic curve.
Figure 5:
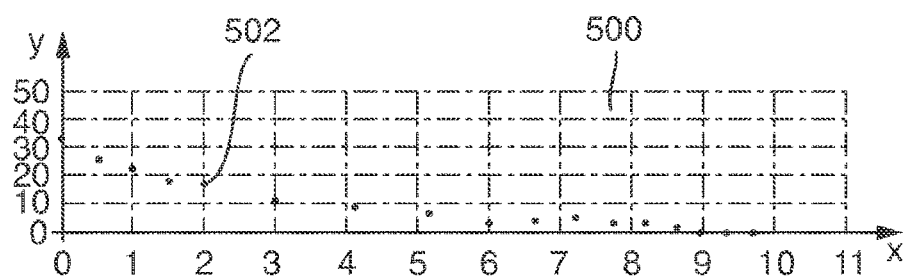
FIG. 5 is a diagram having an error characteristic curve of a second section of a position-force characteristic curve.
Figure 6:
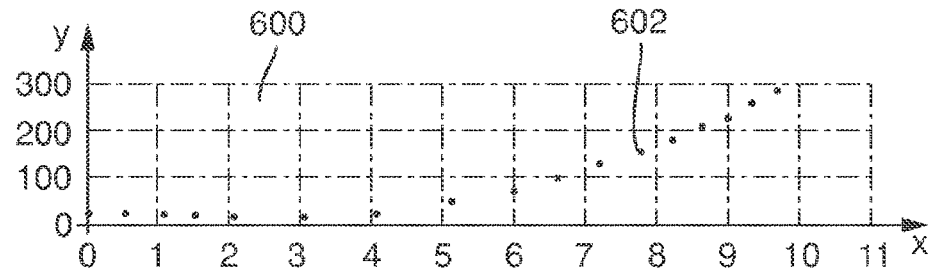
FIG. 6 is a diagram having a total error characteristic curve of a position-force characteristic curve; and, FIG. 7 is a linear prestressing force characteristic curve, a clamping force characteristic curve and a system characteristic curve.

FIG. 4 shows diagram 400 with data points that form error characteristic curve 402 of first section 304 of position-force characteristic curve 302. According to it, the approximation is very good as far as data point 310, and decreases in quality in the direction of greater actuator set position values. FIG. 5 shows diagram 500 with data points that form error characteristic curve 502 of second section 306 of position-force characteristic curve 302. According to it, the approximation relating to data point 310 is very good for larger actuator set position values, and decreases in quality in the direction of smaller actuator set position values. FIG. 6 shows diagram 600 with data points that form total error characteristic curve 602 of position-force characteristic curve 302. Total error characteristic curve 602 is standardized, by dividing the sum of the absolute values of the errors by the number of data points considered. Total error characteristic curve 602 has a minimum at data point 310. The approximation is thus very good in the area of data point 310 and allows an improved determination of additional parameters of the clutch, such as clutch 120 according to FIG. 1, in particular of a biting point.

Alternatively, a total error characteristic curve may also be ascertained by first ascertaining a last data point of the first section and a first data point of the second section, after that determining an absolute value of a difference between these data points, and then determining the total error characteristic curve based on the absolute value of the difference. In this case, there is no gap present between the first section and the second section, as shown in FIG. 3, but rather the first section and the second section overlap each other.

Figure 7:
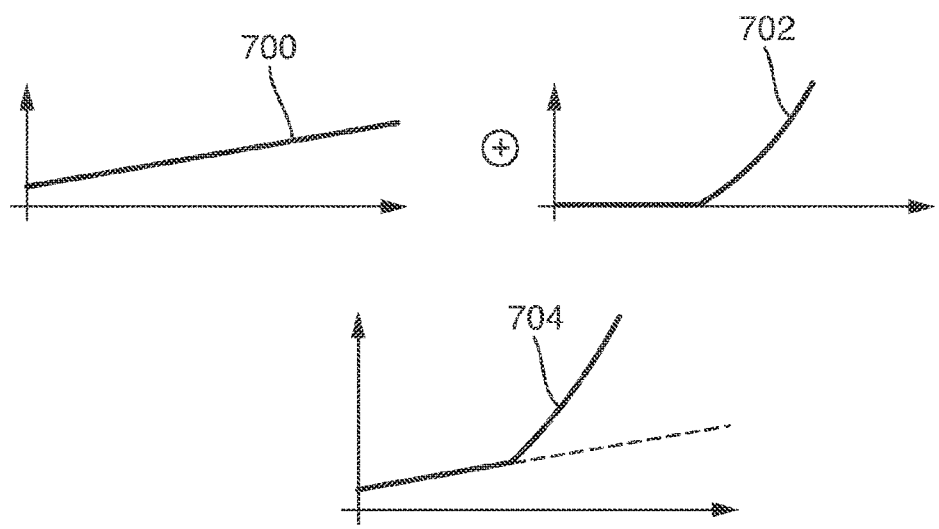

FIG. 7 shows linear prestressing force characteristic curve 700 that corresponds to first section 304 of position-force characteristic curve 302 according to FIG. 3, clamping force characteristic curve 702 that corresponds to second section 306 of position-force characteristic curve 302 according to FIG. 3, and system characteristic curve 704. System characteristic curve 704 may also be referred to as a distance-engaging-force characteristic curve. System characteristic curve 704 results from overlaying prestressing characteristic curve 700 and clamping force characteristic curve 702.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

REFERENCE LABELS

100 Clutch system
102 Transmitting side
104 Control unit
106 Actuator
107 Gear unit
108 Piston
110 Cylinder
112 Pressurizing agent
114 Hydraulic line
116 Receiving side
118 Cylinder
120 Clutch
122 Sensor
124 Sensor
126 Equalizing container
200 Diagram
202 Position-force characteristic curve
300 Diagram
302 Position-force characteristic curve
304 First section
306 Second section
308 Data point
310 Data point
400 Diagram
402 Error characteristic curve
500 Diagram
502 Error characteristic curve
600 Diagram
602 Total error characteristic curve
700 Prestressing force characteristic curve
702 Clamping force characteristic curve
704 System characteristic curve

What is claimed is:

1. A method for ascertaining a biting point of a friction clutch device of a motor vehicle that is actuatable between a disengaged and an engaged position, said friction clutch device includes a hydrostatic actuator device with at least one position sensor and at least one pressure force sensor, said method comprising the following steps:
   actuating said friction clutch device in a disengagement and/or engagement direction;
   ascertaining a pressure in a cylinder of said friction clutch device by means of said at least one pressure force sensor;
   ascertaining a travel distance traversed by said actuator device by means of said at least one position sensor;
   compiling a plurality of data points for the pressure and travel distance on a graph to obtain a position-force characteristic curve having a first section and a second section, said first section being linear and said second section being parabolic;
   ascertaining a last data point of said first section and a first data point of said second section;
   determining an absolute value of a difference between said last data point of said first section and said first data point of said second section; and,
   determining a total error characteristic curve based on said absolute value of said difference and said plurality of data points, wherein the biting point is ascertained based on said total error characteristic curve.

2. The method recited in claim 1, wherein said total error characteristic curve is ascertained based on determining an error characteristic curve of said first section and an error characteristic curve of said second section.

3. The method recited in claim 1, wherein said total error characteristic curve is standardized.

4. The method recited in claim 1, wherein said total error characteristic curve has a minimum and said minimum is drawn upon to ascertain the biting point.

5. The method recited in claim 1, wherein said first section of said position-force characteristic curve has a lower position limiting value and an upper position limiting value, and said lower position limiting value and/or said upper position limiting value are adapted dynamically.

6. The method recited in claim 1, wherein said method is carried out for a dry clutch and/or for a dual clutch.

7. The method recited in claim 1, wherein said method is carried out when starting up said friction clutch device.

8. A method for ascertaining a biting point of a friction clutch device of a motor vehicle that is actuatable between a disengaged and an engaged position, said friction clutch device includes a hydrostatic actuator device with at least one position sensor and at least one pressure force sensor, said method comprising the following steps:
   actuating said friction clutch device in a disengagement and/or engagement direction;
   ascertaining a pressure in a cylinder of said friction clutch device by means of said at least one pressure force sensor;
   ascertaining a travel distance traversed by said actuator device by means of said at least one position sensor;
   compiling a graph comprising the pressure and travel distance to obtain a position-force characteristic curve having a first section and a second section, said first section being linear and said second section being parabolic;
   ascertaining an error characteristic curve of said first section for said ascertained position-force characteristic curve; and,
   ascertaining a biting point based on said error characteristic curve of said first section for a specified biting point force.

* * * * *